Feb. 24, 1925.

D. H. SHERIFF, JR 1,527,578

VARIABLE CONDENSER

Filed March 5, 1923

INVENTOR
D.H.Sheriff, Jr.
BY
Fred G Dieterich
ATTORNEYS

Feb. 24, 1925.

D. H. SHERIFF, JR 1,527,578

VARIABLE CONDENSER

Filed March 5, 1923

INVENTOR
D. H. Sheriff, Jr.
BY
Fred G. Dieterich
ATTORNEYS

Feb. 24, 1925.

D. H. SHERIFF, JR 1,527,578

VARIABLE CONDENSER

Filed March 5, 1923   3 Sheets-Sheet 3

INVENTOR
D.H.Sheriff, Jr.
BY
ATTORNEYS

Patented Feb. 24, 1925.

1,527,578

UNITED STATES PATENT OFFICE.

DAVID HARRISON SHERIFF, JR., OF KANSAS CITY, MISSOURI.

VARIABLE CONDENSER.

Application filed March 5, 1923. Serial No. 622,935.

*To all whom it may concern:*

Be it known that I, DAVID HARRISON SHERIFF, Jr., a citizen of the United States, residing at Kansas City, in the county of Jackson and State of Missouri, have invented certain new and useful Improvements in Variable Condensers, of which the following is a specification.

My invention relates to certain new and useful improvements in condensers, particularly those of the rotary type which are especially adapted for use in radio apparatus and one of the principal objects of the invention is to provide simple, inexpensive means for giving a fine or critical adjustment to the condenser after the usual adjustment has been made. Another object of the invention is to provide a condenser with a second adjustment device, one revolution of which will change the capacity an amount equal to the amount caused by a small movement of the first adjustment, whereby the use of the small condenser employed in parallel with the larger one in radio sets may be dispensed with.

Generically, the invention comprises a rotary type condenser employing a series of stationary, segmental plates alternating with a series of segmental plates mounted to turn on their axes to project between the fixed plates, more or less, to vary the capacity, the plates being held in parallel planes; means are provided, to be operated after the rotary plate adjustment has been effected to vary the capacity without further action of the original adjusting means.

More specifically the invention comprises the combination with a condenser and means for effecting the initial adjustment of the plates thereof to determine approximately the capacity desired; of a fine adjustment device adapted to disturb the previous adjustment and thereby vary the capacity. In its still more specific nature the invention comprises the combination with a rotary type condenser embodying stationary and rotatable plates usually located in parallel planes, of a means for varying the spacing between the several plates after the capacity has been approximately adjusted in the usual manner.

The invention also resides in those novel features of construction, combination and arrangement of parts, all of which will be first fully explained, then be specifically pointed out in the appended claims and illustrated in the accompanying drawings, in which:

Figure 1:
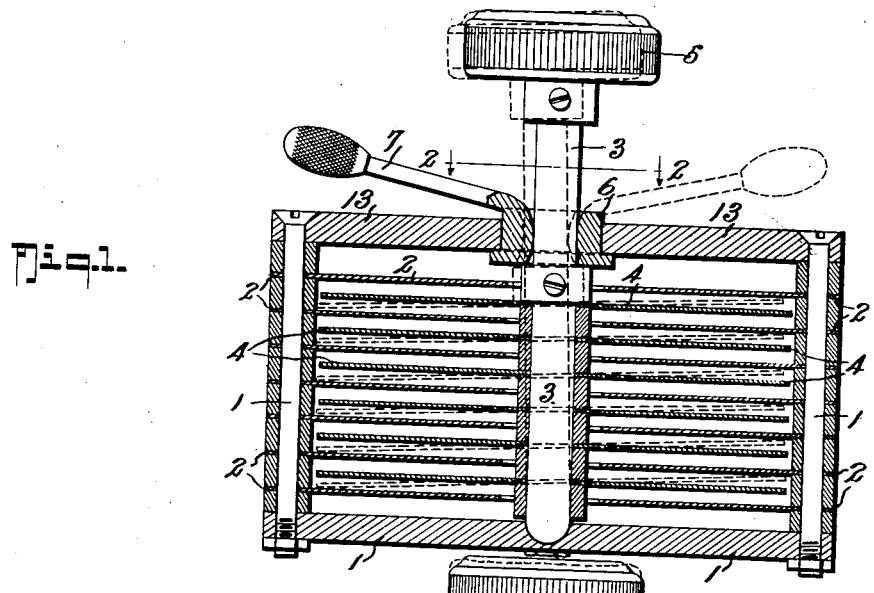
Figure 1 is a vertical section of one embodiment of the invention.

In the drawings in which like numerals of reference indicate like parts in all of the figures, 1 is the usual frame or container for the condenser plates in which the plates 2 are fixedly located, and in which the spindle 3, having the adjusting knob 5, is mounted, the movable or rotatable plates 4 being secured to the spindle 3. The upper bearing, in the present embodiment of my invention, consists of an eccentric bushing 6 that may be turned by means of a lever 7, the spindle 3 having a loose fit in the bearing 6 so that by turning the bearing 6 the spindle 3 may be thrown out of alignment with the axes of the fixed plates and the set of movable plates thrown out of parallelism with the set of fixed plates to thereby vary the capacity after the initial adjustment, through the knob 5, has been made.

Figure 3:
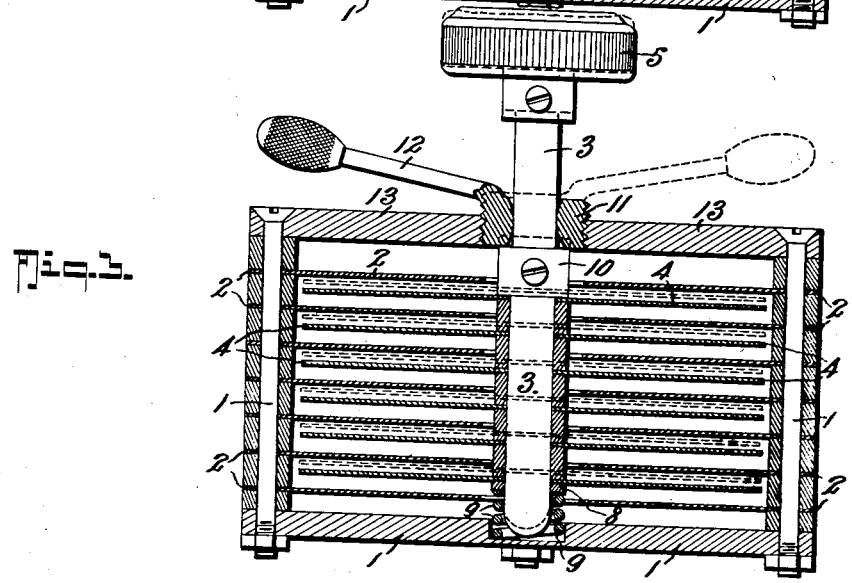
Figure 3 is a vertical section of another embodiment of the invention.
Figure 2:
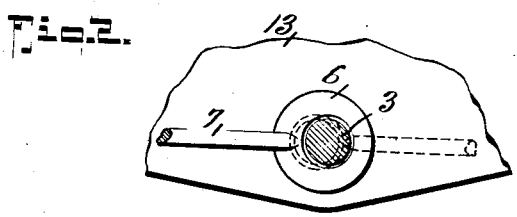
Figure 2 is a detail section on the line 2—2 of Figure 1.
Figure 4:
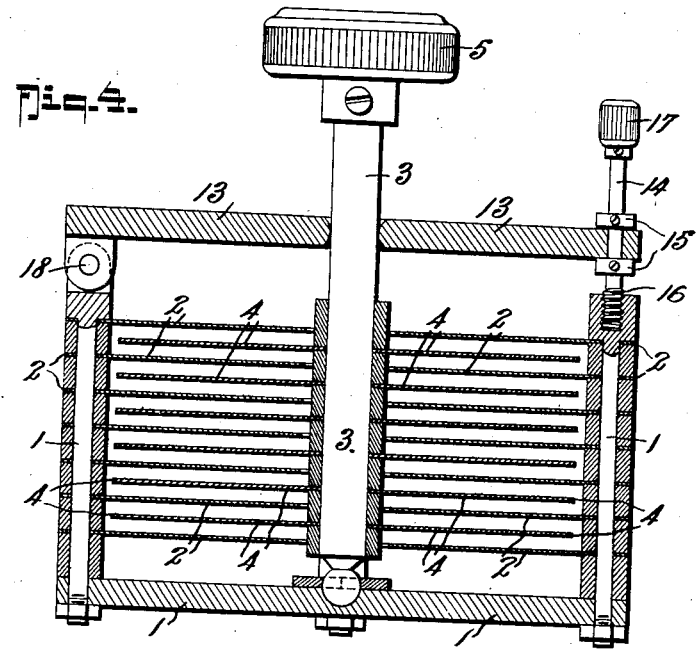
Figure 4 is a vertical section of a third embodiment of the invention.

In the second embodiment of my invention shown in Figure 3 the fine adjustment or variation of the capacity is effected by providing the upper bearing 11 of the shaft 3 with a screw threaded into the top of the frame 1, the bearing 11 being concentric in this embodiment and being provided with a handle 12 by which it may be turned to raise and lower the bearing 11. In this embodiment also the spindle 3 has a shoulder or collar 10 to engage the underside of the bearing 11 against which it is held in contact by a spring 9 located between the collar 8 and the bottom of the frame 1. Turning the handle 12, in this embodiment of the invention, raises or lowers the bearing 11 and thereby brings the plates 4 closer to one or the other of the fixed plates between which the plates 4 are located by the initial adjustment of the knob 5.

In the third embodiment of the invention the top 13 of frame is pivoted or hinged at 18 to allow for a slight rise and fall of the diametrically opposite extremities. In this embodiment the spindle 3 has a loose bearing in the top 13 and the top 13 is provided with a screw 14 which can turn in an aperture in the top but has no longitudinal movement in the top 13 because of the collars 15 secured to the screw 14. The screw 14 is threaded at 16 into the side of the frame and has a knob 17 by which it may be turned. Turning the screw 17 tilts the top 13 out of a horizontal position, either below or above the horizontal, thus throwing the spindle 3 out of vertical position and thereby imparting an inclination thereto which produces substantially the same effect as is produced in the embodiment of the invention first described.

Figure 5:
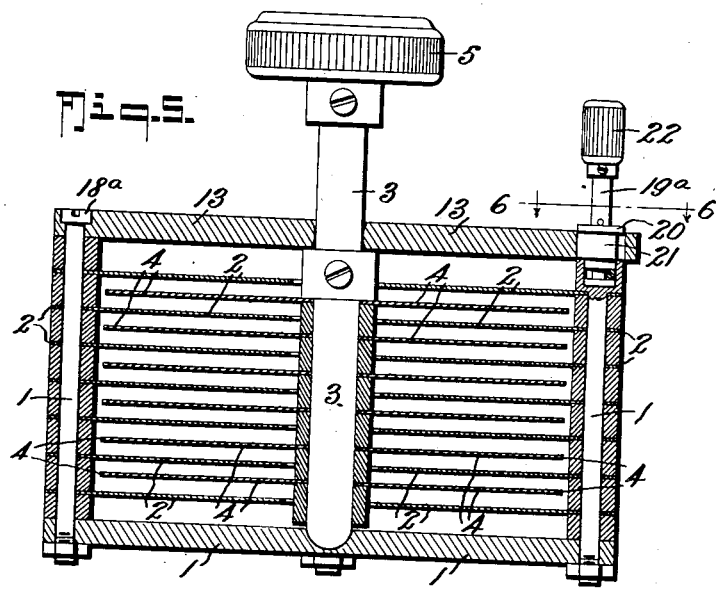
Figure 5 is a vertical section of a fourth embodiment of the invention.
Figure 6:
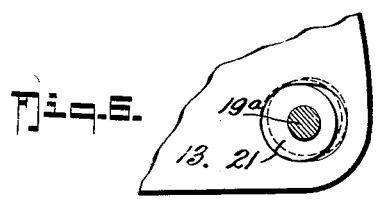
Figure 6 is a detail horizontal section on the line 6—6 of Figure 5.

In the fourth embodiment illustrated particularly in Figures 5 and 6 the top 13 is pivoted at 18ª and is moved always in a horizontal plane by means of an eccentric 21 on the spindle 19ª which is provided with a collar 20 and the adjusting knob 22. The top 13 in this embodiment of the invention is slotted for the passage of the eccentric 21. In this embodiment after making the initial adjustment by turning the knob 5, the knob 22 can be turned to move the top 13 on its pivot 18 laterally and thereby cause an inclination of the spindle 3 which throws the plates 4 out of parallelism with the plates 2 to the degree desired.

Figure 7:
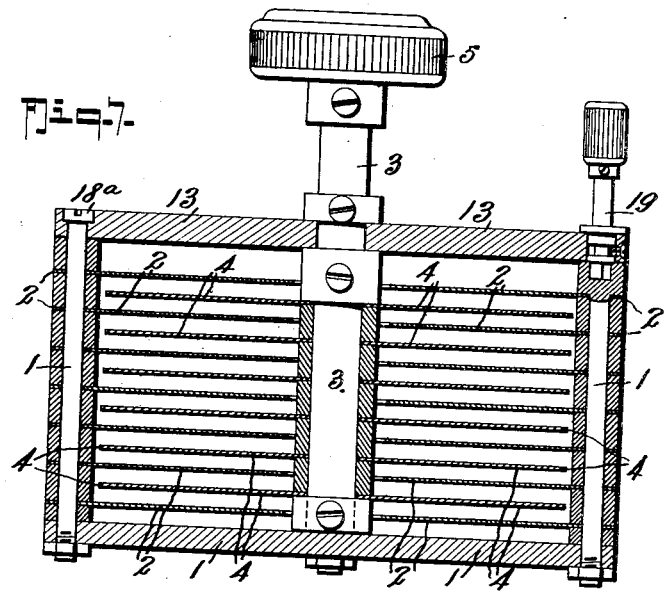
Figure 7 is a vertical section of a modification of the embodiment shown in Figure 5.

In the modification of the embodiment shown in Figure 5 which is illustrated in Figure 7, the spindle 3 has a snug bearing in the top 13 and the fixed plates 2 are rigidly secured to the box or frame 1—1. The fine adjustment spindle 19 is swivelly connected to the frame at its lower end so that by turning the spindle 19 the plates 2 will be moved edgewise or in a horizontal plane and the fine adjustment of the capacity effected in that manner, that is to say, by moving apart or toward each other the rotative or non-rotative plate supports in the planes in which their plates lie.

While I have, in this application, illustrated several embodiments of my invention, I wish it understood that other modifications may be made without departing from the spirit of the invention or the scope of the appended claims, the essential features of the present invention lying in the provision of a fine adjustment means cooperating with the ordinary condenser whereby after the initial adjustment of the plates has been made, a further and more delicate adjustment may be effected.

From the foregoing description, taken in connection with the accompanying drawings it is thought the complete, construction, operation and advantages of my invention will be clear to those skilled in the art, and while I have referred to the part 1 as a frame it is obvious that it may be either an opened frame, or a closed or box-like frame or of any other desired construction, as the detail construction of the parts 1 to 5 inclusive may be that of the well-known rotary plate condensers and, per se, is no part of the present invention.

What I claim is:

1. In a condenser of the type wherein is provided a set of stationary plates and a set of rotative plates with means to rotate the same; a device supplementing the first adjusting means for moving the rotative plates out of and into parallelism with the stationary plates to effect a fine adjustment of the capacity.

2. In a condenser, a set of stationary plates, a spindle with a knob to turn the same and a set of plates mounted on the spindle and adapted to lie parallel to the stationary plates and be moved into and out of position with respect to the same to provide an initial adjustment of the capacity, means for moving said spindle bodily to alter the spacing of the movable set of plates with relation to the stationary set.

3. In a condenser, a set of stationary plates, a spindle with a knob to turn the same and a set of plates mounted on the spindle and adapted to lie parallel to the stationary plates and be moved into and out of position with respect to the same to provide an intial adjustment of the capacity, and means for tilting said spindle to displace the movable plates from parallelism with the fixed plates and vice versa.

4. In a condenser of the type wherein is provided a set of stationary plates and a set of rotative plates with means to rotate the same, a device supplementing the first adjusting means for moving the rotative plates out of and into parallelism with the stationary plates to effect a fine adjustment of the capacity, said device comprising a shifting bearing for the axis of the rotative plates, and means for moving said bearing to tilt the axis.

DAVID HARRISON SHERIFF, JR.